(12) United States Patent
Rhee et al.

(10) Patent No.: US 11,341,765 B2
(45) Date of Patent: May 24, 2022

(54) ELECTRONIC DEVICE COMPRISING SENSOR MODULE FOR SENSING PRESSURE AND TRANSMITTING AND RECEIVING ULTRASOUND SIGNAL BY USING PIEZOELECTRIC ELEMENT

(71) Applicant: Samsung Electronics Co., Ltd., Gyeonggi-do (KR)

(72) Inventors: Bongjae Rhee, Gyeonggi-do (KR); Chihyun Cho, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/056,461

(22) PCT Filed: Jun. 4, 2019

(86) PCT No.: PCT/KR2019/006727
§ 371 (c)(1),
(2) Date: Nov. 18, 2020

(87) PCT Pub. No.: WO2019/245196
PCT Pub. Date: Dec. 26, 2019

(65) Prior Publication Data
US 2021/0319196 A1    Oct. 14, 2021

(30) Foreign Application Priority Data

Jun. 21, 2018   (KR) .................. 10-2018-0071634

(51) Int. Cl.
*G06V 40/13* (2022.01)
*G01L 1/16* (2006.01)
*G06V 10/147* (2022.01)

(52) U.S. Cl.
CPC .......... *G06V 40/1306* (2022.01); *G01L 1/162* (2013.01); *G06V 10/147* (2022.01)

(58) Field of Classification Search
CPC combination set(s) only.
See application file for complete search history.

(56) References Cited

U.S. PATENT DOCUMENTS

2013/0314636 A1   11/2013  Chen et al.
2016/0246396 A1*   8/2016  Dickinson ........... G06F 3/03545
(Continued)

FOREIGN PATENT DOCUMENTS

KR         10-1730835 B1      4/2017
KR    10-2017-0120261 A      10/2017
(Continued)

*Primary Examiner* — Edward F Urban
*Assistant Examiner* — Wassim Mahrouka
(74) *Attorney, Agent, or Firm* — Cha & Reiter, LLC

(57) ABSTRACT

Various embodiments of the present invention relate to an electronic device having a sensor module performing a plurality of functions, the electronic device comprising: the sensor module comprising a plurality of piezoelectric elements including a plurality of first electrodes and a plurality of second electrodes, a first signal terminal connected to the plurality of first electrodes, a second signal terminal, and a plurality of switches capable of selectively connecting at least some electrodes of the plurality of second electrodes to the second signal terminal; and a control circuit. The control circuit is configured to: in a state where the second signal terminal is connected to the at least some electrodes by means of the plurality of switches, detect a pressure inputted into the sensor module by means of the first signal terminal, by using at least some of the plurality of piezoelectric elements; on the basis of the pressure, in a state where the second signal terminal is connected to the at least some electrodes by means of the plurality of switches, output an ultrasound signal by using at least some of the plurality of piezoelectric elements by means of the first signal terminal; in a state where the second signal terminal is disconnected from the at least some electrodes by means of the plurality (Continued)

of switches, receive the ultrasound signal reflected to an external object, by using at least some of the plurality of piezoelectric elements; and generate biometric information on the external object, at least on the basis of the received ultrasound signal. Thus, when waiting for a user's fingerprint touch, the sensor module operates as a pressure sensor, and when a predetermined pressure due to the user's fingerprint touch is detected, the sensor module can operate as a fingerprint sensor. Various other embodiments are possible.

12 Claims, 14 Drawing Sheets

(56) References Cited

U.S. PATENT DOCUMENTS

| | | | |
|---|---|---|---|
| 2017/0330012 A1* | 11/2017 | Salvia | G06F 3/0436 |
| 2017/0364726 A1 | 12/2017 | Buchan et al. | |
| 2017/0372122 A1 | 12/2017 | Shim et al. | |
| 2018/0035923 A1 | 2/2018 | Kang | |
| 2018/0101711 A1 | 4/2018 | D'Souza et al. | |

FOREIGN PATENT DOCUMENTS

| | | | |
|---|---|---|---|
| KR | 10-2018-0016132 A | | 2/2018 |
| KR | 10-2018-0061826 A | | 6/2018 |
| KR | 20180061826 A * | | 6/2018 |
| WO | WO-2014197245 A1 * | 12/2014 | ....... G06F 3/041661 |

* cited by examiner

ND OF INVENTION

ELECTRONIC DEVICE COMPRISING SENSOR MODULE FOR SENSING PRESSURE AND TRANSMITTING AND RECEIVING ULTRASOUND SIGNAL BY USING PIEZOELECTRIC ELEMENT

CROSS REFERENCE TO RELATED APPLICATIONS

This application is a National Phase Entry of PCT International Application No. PCT/KR2019/006727, which was filed on Jun. 4, 2019, and claims a priority to Korean Patent Application No. 10-2018-0071634, which was filed on Jun. 21, 2018, the contents of which are incorporated herein by reference.

TECHNICAL FIELD

Various embodiments of the disclosure relate to an electronic device having a sensor module for sensing a pressure and transmitting and receiving an ultrasound signal using piezoelectric elements.

BACKGROUND ART

With the increase in use of electronic devices such as a portable terminal, various functions are provided to the electronic devices.

The electronic devices may include various sensors in order to perform the various functions.

For example, the electronic devices may include at least one of a fingerprint sensor, a pressure sensor, and a touch sensor.

DETAILED DESCRIPTION OF INVENTION

Technical Problem

To wake up the fingerprint sensor, the electronic device receives help from the pressure sensor and the touch sensor, or has to periodically operate the fingerprint sensor itself.

However, the above-mentioned method of waking up the fingerprint sensor may not only make prompt fingerprint sensing difficult, but cause high power consumption of the electronic device.

Various embodiments of the disclosure make it possible to provide an electronic device having a sensor module for sensing a pressure and transmitting and receiving an ultrasound signal using piezoelectric elements.

Solution to Problem

An electronic device according to various embodiments of the disclosure may include: a sensor module configured to include a plurality of piezoelectric elements having a plurality of first electrodes and a plurality of second electrodes, a first signal terminal connected to the plurality of first electrodes, a second signal terminal, and a plurality of switches enabling the second signal terminal to be selectively connected to at least some of the plurality of second electrodes; and a control circuit. The control circuit is configured to: in a state in which the second signal terminal is connected to the at least some electrodes by the plurality of switches, detect a pressure, which is input into the sensor module by at least some of the plurality of piezoelectric elements, through the first signal terminal; on the basis of at least the pressure, in a state in which the second signal terminal is connected to the at least some electrodes by the plurality of switches, output an ultrasound signal through the first signal terminal using at least some of the plurality of piezoelectric elements; in a state in which the second signal terminal is disconnected from the at least some electrodes using the plurality of switches, receive the ultrasound signal reflected from an external object using at least some of the plurality of piezoelectric elements; and generate biological information about the external object on the basis of at least the received ultrasound signal.

Further, an electronic device according to various embodiments of the disclosure may include: a sensor module configured to include a plurality of piezoelectric elements having a plurality of first electrodes and a plurality of second electrodes, a first signal terminal connected to the plurality of first electrodes, a second signal terminal, and a plurality of switches enabling the second signal terminal to be selectively connected to at least some of the plurality of second electrodes; a pressure sensing circuit configured to, in a state in which the second signal terminal is connected to the at least some electrodes by the plurality of switches, detect a pressure, which is input into the sensor module by at least some of the plurality of piezoelectric elements, through the first signal terminal; and an ultrasound sensing circuit configured to, in a state in which the second signal terminal is disconnected from the at least some electrodes using the plurality of switches, obtain an ultrasound signal reflected from an external object using at least some of the plurality of piezoelectric elements.

In addition, an electronic device according to various embodiments of the disclosure may include: a sensor module configured to include a plurality of piezoelectric elements having a plurality of first electrodes and a plurality of second electrodes, a first signal terminal connected to the plurality of first electrodes, a second signal terminal, and a plurality of switches enabling the second signal terminal to be selectively connected to at least some of the plurality of second electrodes; and a control circuit. The control circuit is configured to: in a state in which the second signal terminal is connected to the at least some electrodes by the plurality of switches, detect a pressure, which is input into the sensor module by at least some of the plurality of piezoelectric elements, through the first signal terminal; in a state in which the second signal terminal is disconnected from the at least some electrodes using the plurality of switches, receive an ultrasound signal reflected from an external object using at least some of the plurality of piezoelectric elements; and generate biological information about the external object on the basis of at least the received ultrasound signal.

Advantageous Effects of Invention

According to various embodiments of the disclosure, a sensor module is made to operate as a pressure sensor while waiting for a fingerprint input of a user, but as a fingerprint sensor if a predetermined pressure is detected due to the fingerprint input of the user, whereby, because there is no need to receive help from an external device or periodically operate the sensor module itself, prompt fingerprint sensing can be performed, and current consumption of an electronic device can be minimized.

MODE FOR THE INVENTION

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the disclosure.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B. The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

Figure 1:
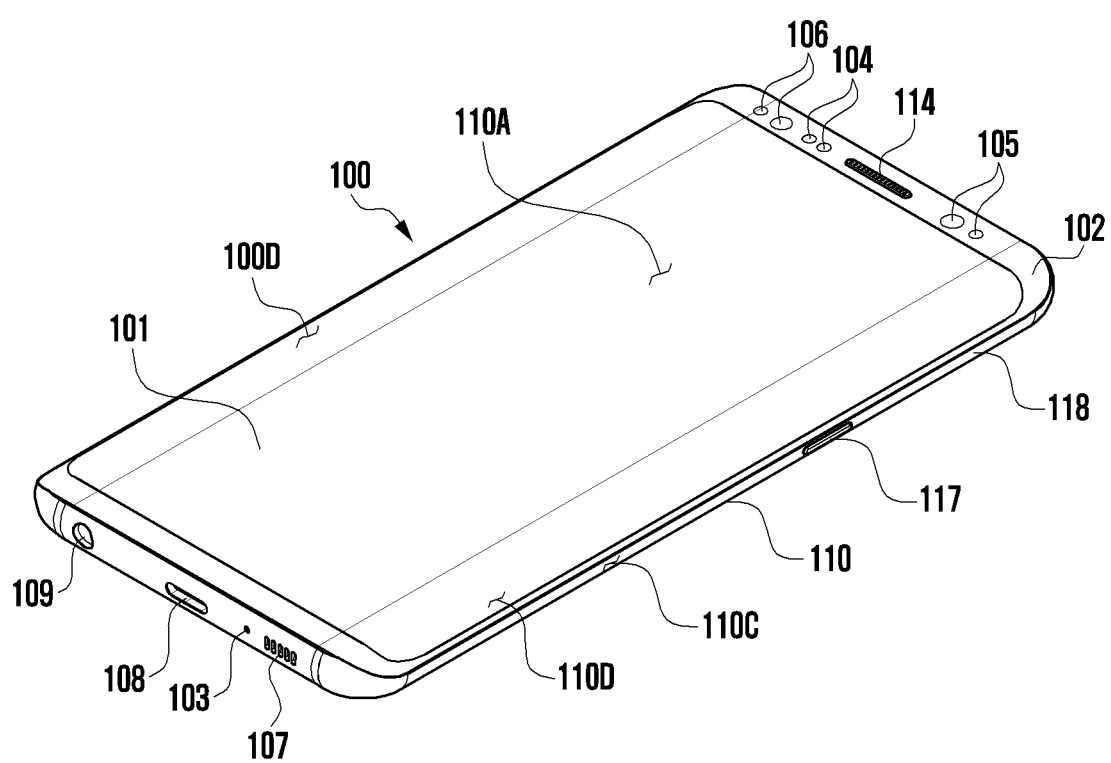
FIG. 1 is a perspective view illustrating a front surface of a mobile electronic device according to an embodiment.
Figure 2:
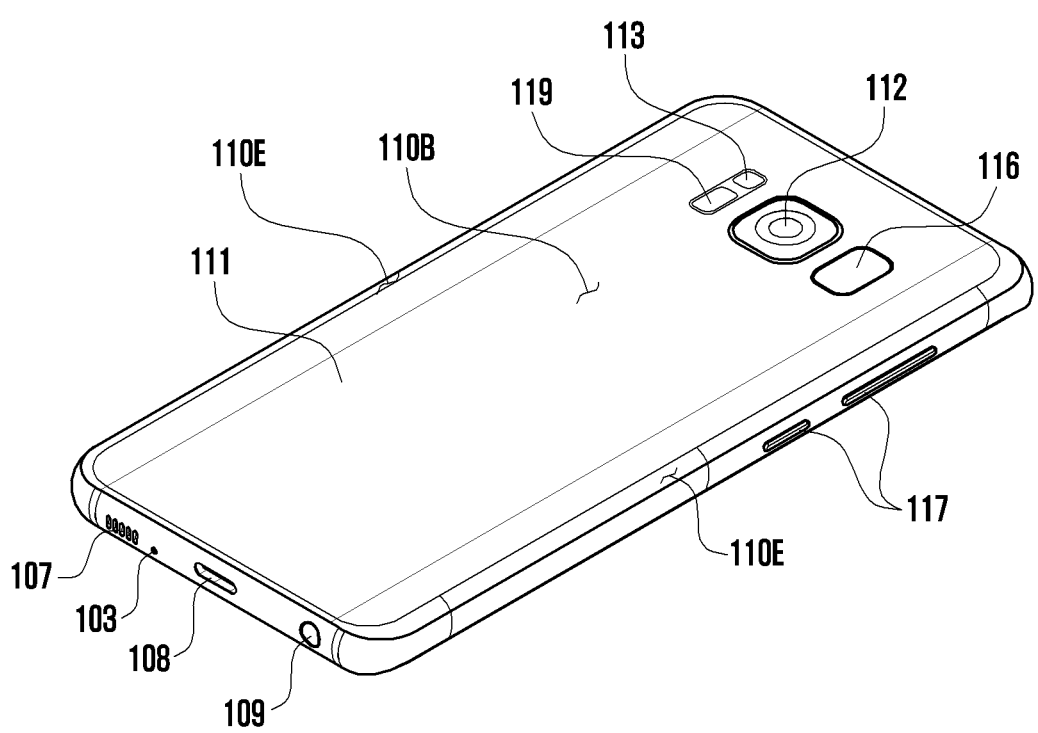
FIG. 2 is a perspective view illustrating a rear surface of the electronic device of FIG. 1.

FIG. 1 is a perspective view of the front surface of a mobile electronic device according to an embodiment of the disclosure. FIG. 2 is a perspective view of the rear surface of the electronic device of FIG. 1 according to an embodiment of the disclosure.

Referring to FIG. 1 and FIG. 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

In the illustrated embodiment, the front plate 102 may include two first areas 110D on both ends of the long edge of the front plate 102 such that the two first areas 110D bend from the first surface 110A toward the rear plate 111 and extend seamlessly. In the illustrated embodiment (see FIG. 2), the rear plate 111 may include two second areas 110E on both ends of the long edge such that the two second areas 110E bend from the second surface 110B toward the front plate 102 and extend seamlessly. In some embodiments, the front plate 102 (or the rear plate 111) may include only one of the first areas 110D (or the second areas 110E). In another embodiment, a part of the first areas 110D or the second areas 110E may not be included. In the above embodiments, when seen from the side surface of the electronic device 100, the side bezel structure 118 may have a first thickness (or width) on a part of the side surface, which does not include the first areas 110D or the second areas 110E as described above, and may have a second thickness that is smaller than the first thickness on a part of the side surface, which includes the first areas 110D or the second areas 110E.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the constituent elements (for example, the key input device 117 or the light-emitting element 106) of the electronic device 100 may be omitted, or the electronic device 100 may additionally include another constituent element.

The display 101 may be exposed through a corresponding part of the front plate 102, for example. In some embodiments, at least a part of the display 101 may be exposed through the front plate 102 that forms the first areas 110D of the side surface 110C and the first surface 110A. In some embodiments, the display 101 may have a corner formed in substantially the same shape as that of the adjacent outer periphery of the front plate 102. In another embodiment (not illustrated), in order to increase the area of exposure of the display 101, the interval between the outer periphery of the display 101 and the outer periphery of the front plate 102 may be formed to be substantially identical.

In another embodiment (not illustrated), a recess or an opening may be formed in a part of the screen display area of the display 101, and at least one of an audio module 114, a sensor module 104, a camera module 105, and a light-emitting element 106 may be included and aligned with the recess or the opening. In another embodiment (not illustrated), on the back surface of the screen display area of the display 101, at least one of an audio module 114, a sensor module 104, a camera module 105, a fingerprint sensor 116, and a light-emitting element 106 may be included. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 104 and 119 and/or at least a part of the key input device 117 may be arranged in the first areas 110D and/or the second areas 11E.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, an HRM sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented in another type, such as a soft key, on the display 101. In some embodiments, the key input device may include a sensor module 116 arranged on the second surface 110B of the housing 110.

The light-emitting element 106 may be arranged on the first surface 110A of the housing 110, for example. The light-emitting element 106 may provide information regarding the condition of the electronic device 100 in a light type, for example. In another embodiment, the light-emitting element 106 may provide a light source that interworks with operation of the camera module 105, for example. The light-emitting element 106 may include, for example, a light-emitting diode (LED), an infrared light-emitting diode (IR LED), and a xenon lamp.

The connector holes 108 and 109 may include a first connector hole 108 capable of containing a connector (for example, a universal serial bus (USB) connector) for transmitting/receiving power and/or data to/from an external electronic device, and/or a second connector hole (for example, an earphone jack) 109 capable of containing a connector for transmitting/receiving an audio signal to/from the external electronic device.

Figure 3:
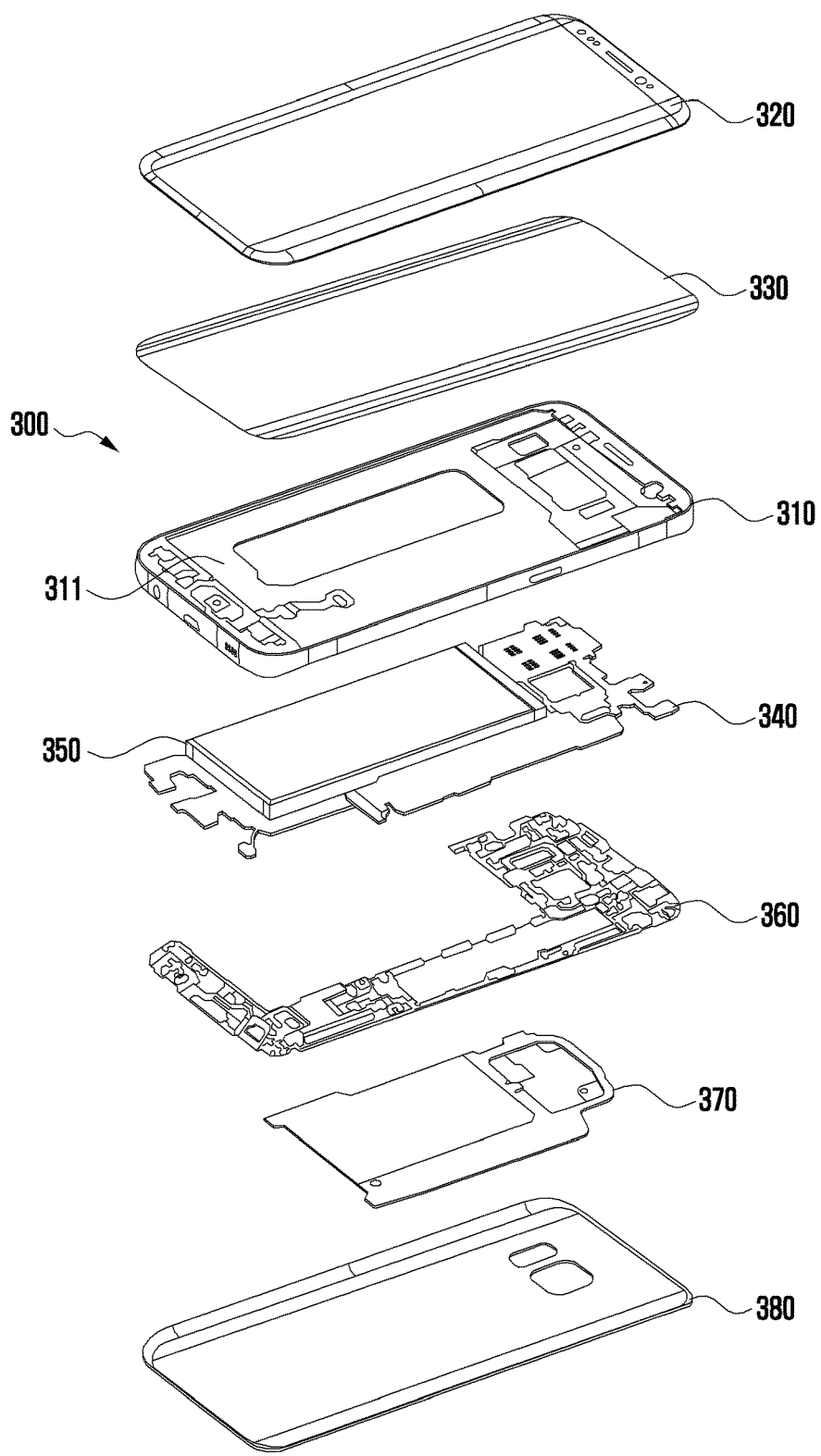
FIG. 3 is an exploded perspective view illustrating the electronic device of FIG. 1.

FIG. 3 is a developed perspective view of an electronic device of FIG. 1 according to an embodiment of the disclosure.

Referring to FIG. 3, an electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 100 of FIG. 1 or FIG. 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a nonvolatile memory, for example.

The interface may include, for example, a high definition multimedia interface (HDMI), a universal serial bus (USB) interface, a secure digital (SD) card interface, and/or an audio interface. The interface may connect the electronic device 300 with an external electronic device electrically or physically, for example, and may include a USB connector, an SD card/multi-media card (MMC) connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

Figure 4:
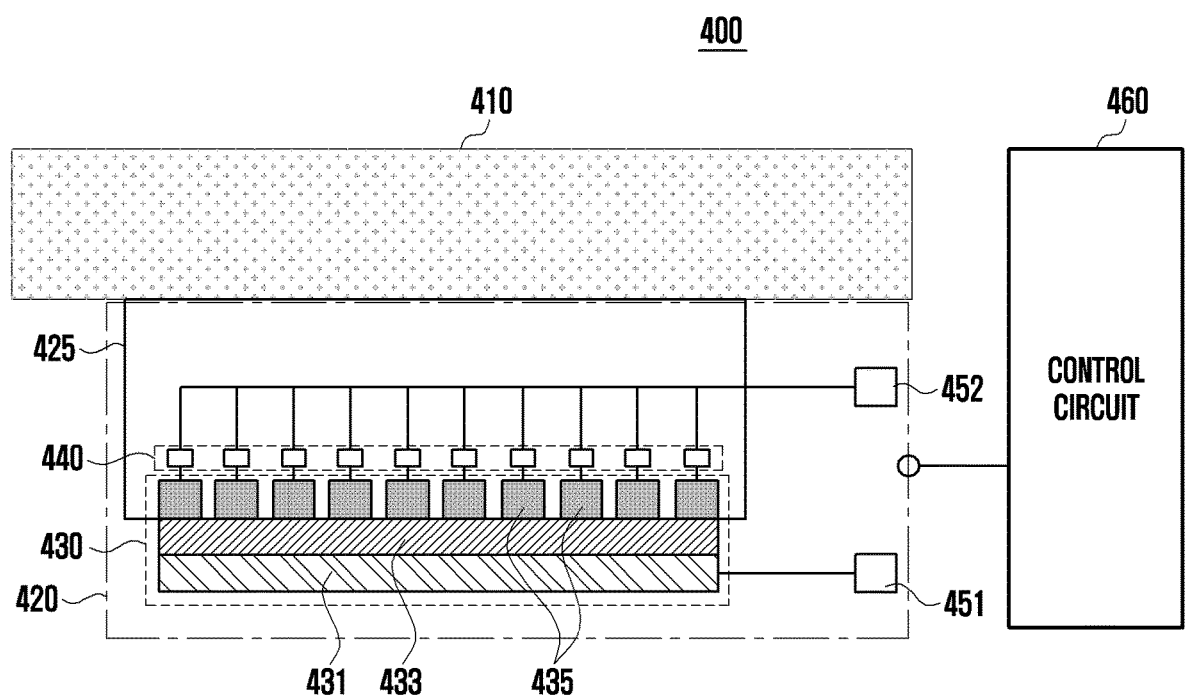
FIG. 4 is a view schematically illustrating the configuration of an electronic device having a sensor module performing a plurality of functions according to various embodiments of the disclosure.

FIG. 4 is a view schematically illustrating the configuration of an electronic device having a sensor module performing a plurality of functions according to various embodiments of the disclosure.

According to various embodiments of the disclosure, an electronic device 400 of FIG. 4 may include, for instance, all or part of the configuration of the electronic device 100 of FIG. 1 or the electronic device 300 of FIG. 3. A display 410 of FIG. 4 may include, for instance, the display 101 of FIG. 1 or the display 330 of FIG. 3. A sensor module 420 of FIG. 4 may include, for instance, at least one of the sensor modules 104, 116, and 119 of FIGS. 1 and 2.

Referring to FIG. 4, the electronic device 400 according to various embodiments of the disclosure may include the display 410, the sensor module 420, and a control circuit 460 (e.g., a processor).

According to various embodiments, the display 410 may display various types of content (e.g., texts, images, videos, icons, and/or symbols) to a user. The display 410 may include a touch screen, and may receive, for instance, touch, gesture, proximity or hovering input using an electronic pen or a part of the body of a user. The display 410 may include, for instance, at least one of a liquid crystal display (LCD), a light emitting diode (LED) display, an organic light emitting diode (OLED) display, an active matrix organic light emitting diode (AMOLED) display, a microelectromechanical systems (MEMS) display, or an electronic paper display.

According to various embodiments, the sensor module 420 may be disposed at a lower portion of the display 410. The sensor module 420 may operate as a pressure sensor while waiting for fingerprint input of a user of the electronic device 400. The sensor module 420 may operate as an ultrasound fingerprint sensor if a predetermined pressure is detected through the display 410.

According to an embodiment, the sensor module 420 may include a substrate 425, piezoelectric elements 430, a plurality of switches 440, a first signal terminal 451, and a second signal terminal 452.

The substrate 425 may be a glass substrate. The substrate 425 may be a plastic substrate formed of at least one of polyimide, polymethylmethacrylate, polyamide, polypropylene, or polyurethane. According to an embodiment, the substrate 425 may include a thin-film transistor (TFT) substrate.

The piezoelectric elements 430 may be disposed on the substrate 425. If a predetermined pressure is applied through the display 410, the piezoelectric elements 430 may generate a potential difference based on the pressure.

According to an embodiment, the piezoelectric elements 430 may include first electrodes 431, a piezoelectric layer 433, and second electrodes 435. For example, the first electrodes 431 may be disposed at a lower portion of the piezoelectric layer 433. The second electrodes 435 may be disposed at an upper portion of the piezoelectric layer 433. For example, the piezoelectric layer 433 may be disposed between the first electrodes 431 and the second electrodes 435. The first electrodes 431 may include a common electrode. The first electrodes 431 may include a plurality of signal lines. The first electrodes 431 may be formed of a gold (Au), silver (Ag), or copper (Cu) layer in order to minimize resistance. The piezoelectric layer 433 may generate a voltage dependent on the predetermined pressure. The piezoelectric layer 433 may generate ultrasound vibration. The piezoelectric layer 433 may be formed of at least one of polyvinylidene fluoride (PVDF), polyvinylidene fluoride-co-trifluoroethylen (PVDF-TrFE), and lead zirconate titanate (PZT). The second electrodes 435 may include pixel electrodes configured in units of pixels. The second electrodes 435 may include a plurality of signal lines.

The plurality of switches 440 may be configured as a thin-film transistor (TFT) array. The plurality of switches 440 may switch on/off the pixels of the second electrodes.

The first signal terminal 451 may be connected to the first electrodes. The second signal terminal 452 may be connected to the plurality of switches 440. The second signal terminal 452 may be selectively connected to at least some of the pixel electrodes of the second electrodes 435 using the plurality of switches 440.

According to various embodiments, the control circuit 460 may be connected to the first signal terminal 451. The first signal terminal 451 may detect a pressure that is input into the sensor module using at least some of the first electrodes 431 and the second electrodes 435 of the piezoelectric elements 430. The control circuit 460 may control the sensor module 420 to perform a pressure sensor function and a fingerprint sensor function.

According to an embodiment, the control circuit 460 may be configured to detect the pressure of a user finger, which is input into the sensor module 420 through the display 410 using at least some of the first electrodes 431 and the second electrodes 435 of the piezoelectric elements 430, through the first signal terminal 451 in a state in which the second signal terminal 452 is connected to at least some of the second electrodes 435 using the plurality of switches 440. According to an embodiment, the second signal terminal 452 may be connected to a ground (not illustrated) of the electronic device 400.

According to an embodiment, the control circuit 460 may be configured to output an ultrasound signal through the first signal terminal 451 using at least some of the first electrodes 431 and the second electrodes 435 of the piezoelectric elements 430 on the basis of at least the pressure of the user finger which is input into the sensor module 420 through the display 410 in the state in which the second signal terminal 452 is connected to at least some of the second electrodes 435 using the plurality of switches 440.

According to an embodiment, the control circuit 460 may be configured to receive an ultrasound signal reflected from an external object (e.g., a finger) on the display 410 using at least some of the first electrodes 431 and the second electrodes 435 of the piezoelectric elements 430 in a state in which the second signal terminal 452 is disconnected from at least some of the second electrodes 435 using the plurality of switches 440. According to an embodiment, in the state in which the second signal terminal 452 is disconnected from at least some of the second electrodes 435 using the plurality of switches 440, the first signal terminal 451 may be connected to the ground (not illustrated) of the electronic device 400.

According to an embodiment, the control circuit 460 may be configured to generate biological information (e.g., fingerprint information) about an external object (e.g., a finger) on the display 410 on the basis of at least the received ultrasound signal. According to an embodiment, the control circuit 460 may be configured to connect the plurality of switches 440 in order, and to obtain the received ultrasound signal.

According to various embodiments, in a standby mode of waiting for the fingerprint input of a user, the sensor module 420 of the electronic device 400 according to various embodiments is configured to allow the first electrodes 431 to be connected to the first signal terminal 451 and to receive analog output, and to allow the second electrodes 435 to be connected to the ground of the electronic device 400 using the plurality of switches 440.

Figure 5:
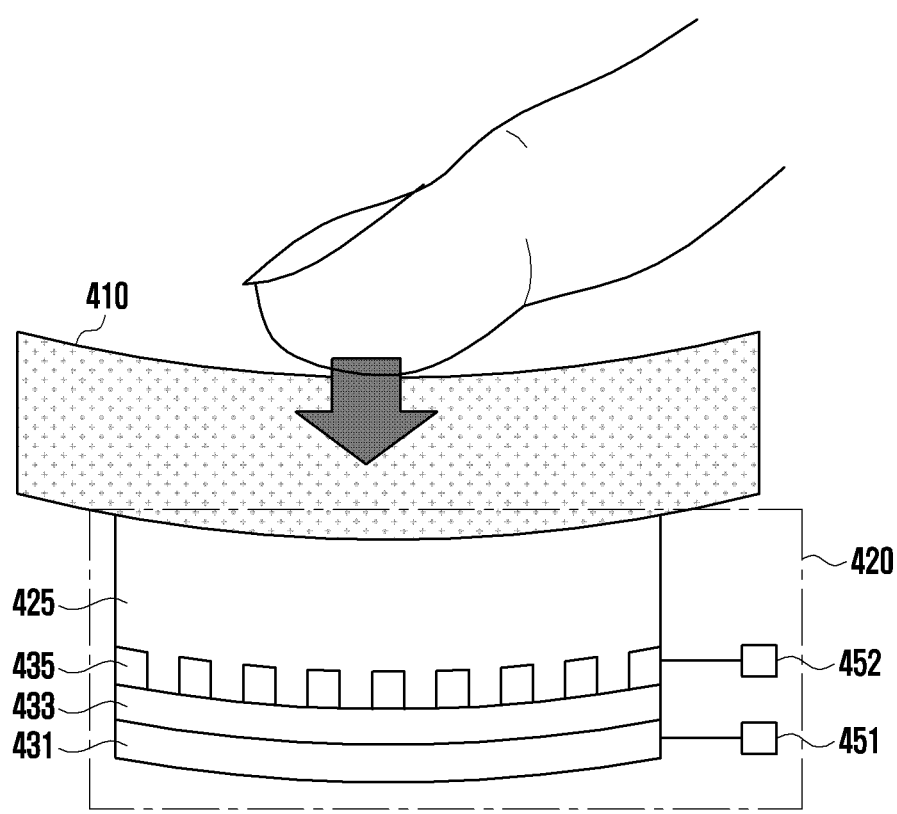
FIG. 5 is a view illustrating an operation of an electronic device according to various embodiments of the disclosure converting a pressure sensor function into a fingerprint sensor function.

FIG. 5 is a view illustrating an operation of an electronic device according to various embodiments of the disclosure converting a pressure sensor function into a fingerprint sensor function.

Referring to FIG. 5, the sensor module 420 of the electronic device 400 according to various embodiments of the disclosure may operate in a standby mode of waiting for the fingerprint input of a user.

According to an embodiment, a user of the electronic device 400 may touch the display 410 located on the sensor module 420 with his/her finger, and apply a pressure. If the pressure is applied, a potential difference of about 0.1 V to 2 V may be generated depending on a flexure of the piezoelectric layer 433. If the control circuit 460 detects the potential difference to determine that a voltage above a threshold is generated, the control circuit 460 may control the sensor module 420 to perform a fingerprint sensor function in a pressure sensor function.

Figure 6:
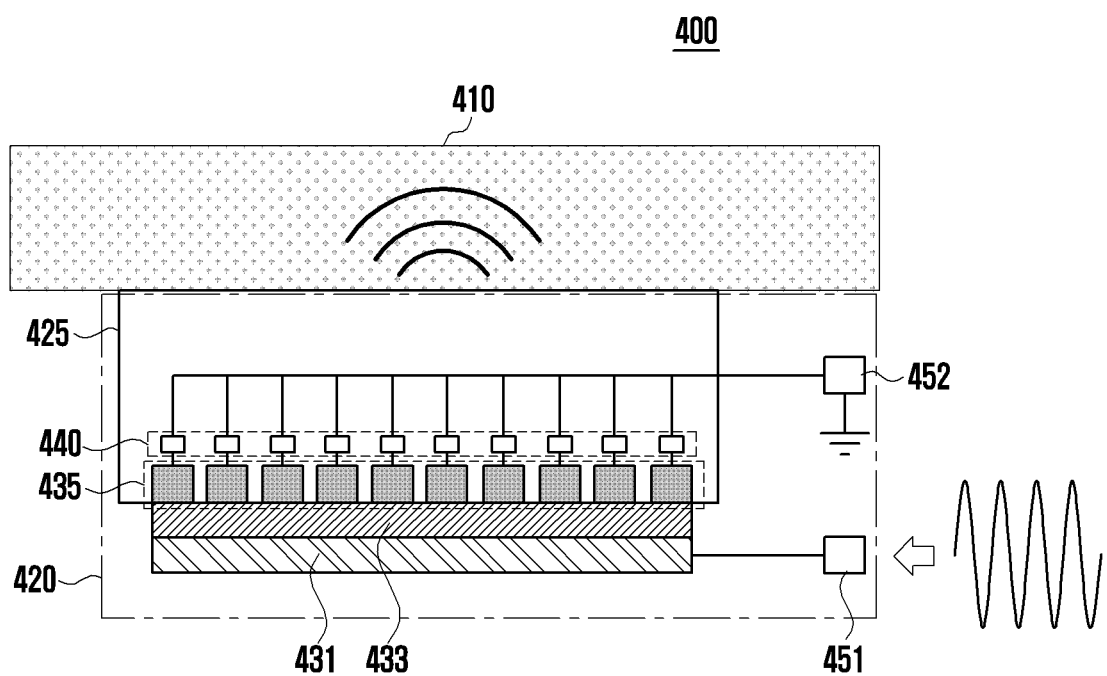
FIG. 6 is a view illustrating a transmitting mode when an electronic device according to various embodiments of the disclosure operates as a fingerprint sensor.

FIG. 6 is a view illustrating a transmitting mode when an electronic device according to various embodiments of the disclosure operates as a fingerprint sensor.

Referring to FIG. 6, as the pressure sensor function is converted into the fingerprint sensor function, the sensor module 420 of the electronic device 400 according to various embodiments of the disclosure may operate in a transmitting mode (a Tx mode) of transmitting an ultrasonic wave.

According to an embodiment, in the case where the sensor module 420 operates in the Tx mode, the first electrodes 431 connected to the first signal terminal 451 may operate as oscillators capable of receiving analog output. The second electrodes 435 may be connected to the second signal terminal 452 using the plurality of switches 440. The second signal terminal 452 may be connected to the ground of the electronic device 400. Depending on oscillation of the first electrodes 431, the piezoelectric layer 433 may generate ultrasound oscillation. According to an embodiment, depending on a potential difference generated between the first electrodes 431 and the piezoelectric layer 433, the piezoelectric layer 433 may generate an ultrasonic wave, and the generated ultrasonic wave may be transmitted toward the display 410.

Figure 7:
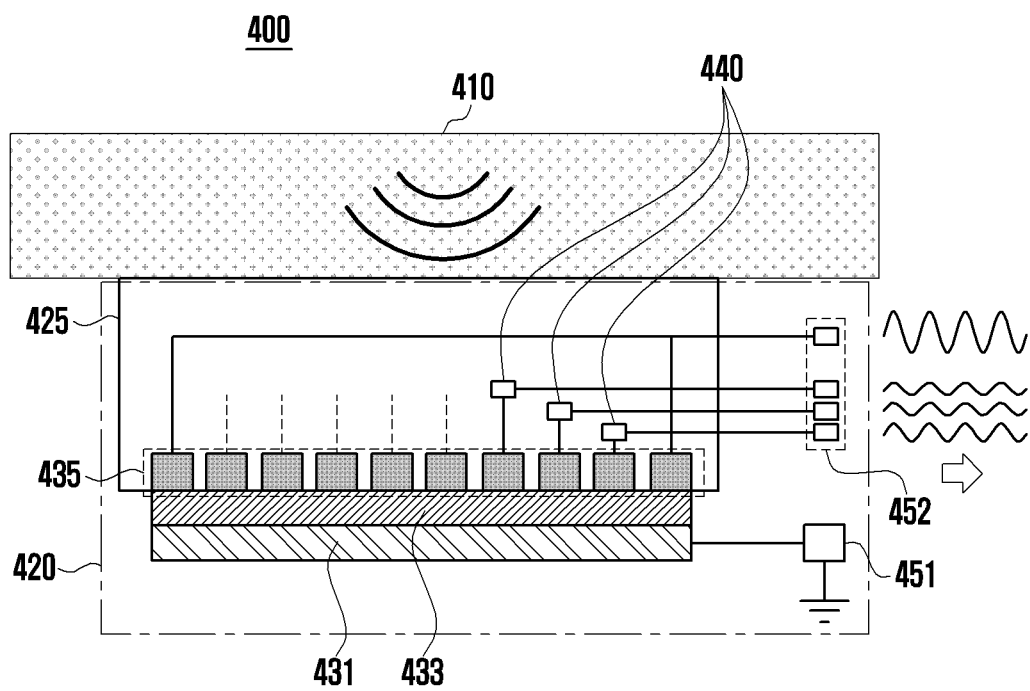
FIG. 7 is a view illustrating a receiving mode when an electronic device according to various embodiments of the disclosure operates as a fingerprint sensor.

FIG. 7 is a view illustrating a receiving mode when an electronic device according to various embodiments of the disclosure operates as a fingerprint sensor.

Referring to FIG. 7, as the pressure sensor function is converted into the fingerprint sensor function, the sensor module 420 of the electronic device 400 according to various embodiments of the disclosure may operate in a receiving mode (an Rx mode) of receiving an ultrasonic wave.

According to an embodiment, in the case where the sensor module 420 operates in the Rx mode, the first electrodes 431 connected to the first signal terminal 451 may be connected to the ground of the electronic device 400. The second electrodes 435 of the sensor module 420 may be connected to the plurality of switches 440, and may detect a voltage applied through the display 410 in units of pixels. The ultrasonic wave transmitted to the display 410 in the above-mentioned Tx mode may be reflected by an external object (e.g., a finger). The piezoelectric layer 433 of the sensor module 420 may convert intensity of ultrasound oscillation, which is reflected by each of the pixels of the second electrodes 435, into a voltage. According to an embodiment, the control circuit 460 may obtain an image (e.g., a fingerprint image) corresponding to the external object using the ultrasonic wave received through the second electrodes 435 in units of pixels.

Figure 8:
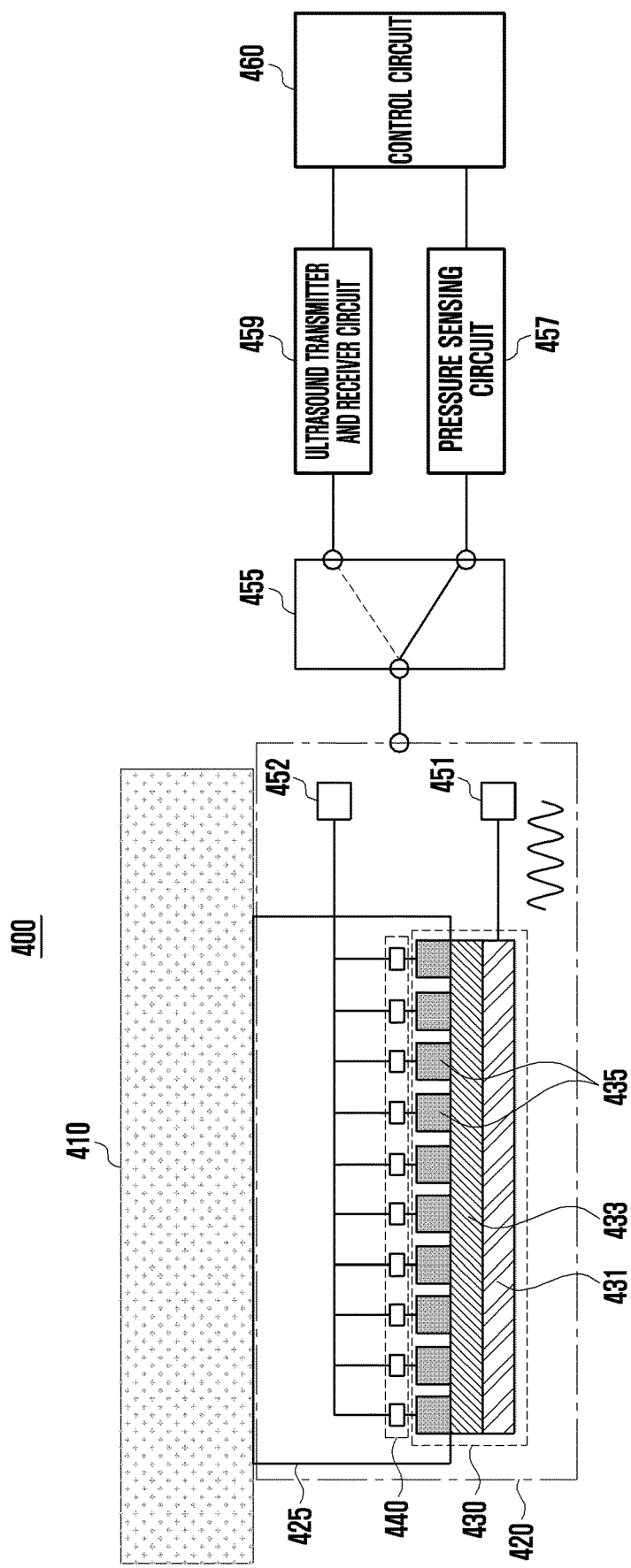
FIG. 8 is a view schematically illustrating another configuration of an electronic device having a sensor module performing a plurality of functions according to various embodiments of the disclosure.

FIG. 8 is a view schematically illustrating another configuration of an electronic device having a sensor module performing a plurality of functions according to various embodiments of the disclosure.

Referring to FIG. 8, the electronic device 400 according to various embodiments of the disclosure may further include a switch circuit 455, a pressure sensing circuit 457, and an ultrasound transmitter and receiver circuit 459 in addition to the display 410, the sensor module 420, and the control circuit 460 that are illustrated in FIG. 4.

The switch circuit 455 may be connected to the first electrodes 431 through the first signal terminal 451. The switch circuit 455 may selectively connect the first signal terminal 451 to the pressure sensing circuit 457 or the ultrasound transmitter and receiver circuit 459.

The pressure sensing circuit 457 may detect a voltage corresponding to the pressure generated through the display 410. The pressure sensing circuit 457 may be made up of a filter or an amplifier for increasing a signal to noise ratio (SNR).

The ultrasound transmitter and receiver circuit 459 may transmit an ultrasonic wave to the display 410, and receive an ultrasound signal reflected from the display 410.

According to an embodiment, in the case where the sensor module 420 operates in the standby mode of waiting for the fingerprint input of a user, the first electrodes 431 may be connected to the pressure sensing circuit 457 through the first signal terminal 451 and the switch circuit 455, and may detect a voltage generated by a pressure applied to the sensor module 420 through the display 410.

According to an embodiment, in the case where the sensor module 420 operates in the Tx mode of transmitting the ultrasonic wave, the first electrodes 431 may be connected to the ultrasound transmitter and receiver circuit 459 through the first signal terminal 451 and the switch circuit 455, and may receive an analog signal for generating an ultrasound signal required for fingerprint sensing of an external object (e.g., a finger) on the display 410.

According to an embodiment, the pressure sensing circuit 457 may be configured to detect a pressure of a user finger, which is input into the sensor module 420 through the display 410, through the first signal terminal 451 using at least some of the first electrodes 431 and the second electrodes 435 of the piezoelectric elements 430 in a state in which the second signal terminal 452 is connected to at least some of the second electrodes 435 using the plurality of switches 440. According to an embodiment, the second signal terminal 452 may be connected to the ground (not illustrated) of the electronic device 400.

According to an embodiment, the ultrasound transmitter and receiver circuit 459 may be configured to obtain an ultrasound signal reflected from an external object (e.g., a finger) touched to the display 410 using at least some of the first electrodes 431 and the second electrodes 435 of the piezoelectric elements 430 in a state in which the second signal terminal 452 is disconnected from at least some of the second electrodes 435 using the plurality of switches 440.

According to an embodiment, in the state in which the second signal terminal 452 is disconnected from at least some of the second electrodes 435 using the plurality of switches 440, the ultrasound transmitter and receiver circuit 459 may be configured to obtain an ultrasound signal reflected from an external object (e.g., a finger) touched to the display 410 using a voltage induced between some others of the second electrodes 435 and the first signal terminal. According to an embodiment, in the state in which the second signal terminal 452 is disconnected from at least some of the second electrodes 435 using the plurality of switches 440, the first signal terminal 451 may be connected to the ground (not illustrated) of the electronic device 400.

According to an embodiment, the control circuit 460 may be configured to generate biological information (e.g., fingerprint information) about an external object (e.g., a finger) on the display 410 on the basis of at least the ultrasound signal detected through the ultrasound transmitter and receiver circuit 459.

Figure 9:
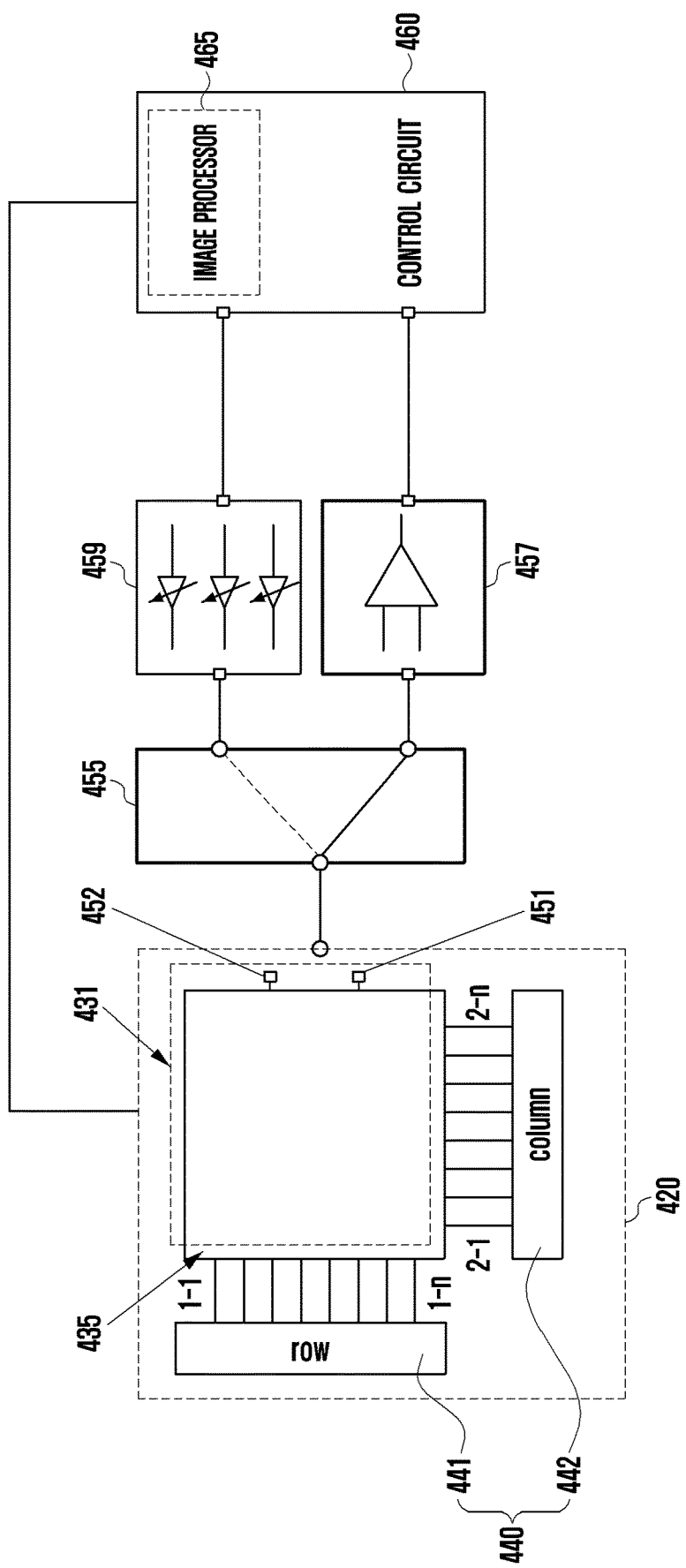
FIG. 9 is a view schematically illustrating yet another configuration of an electronic device having a sensor module performing a plurality of functions according to various embodiments of the disclosure.

FIG. 9 is a view schematically illustrating yet another configuration of an electronic device having a sensor module performing a plurality of functions according to various embodiments of the disclosure.

Referring to FIG. 9, the electronic device 400 according to various embodiments of the disclosure may further include a first selector 441, a second selector 442, and an image processor 465 in addition to the configuration illustrated in FIG. 8.

According to an embodiment, the plurality of switches 440 may include the first selector 441 and the second selector 442. The first selector 441 and the second selector 442 may recognize a voltage applied to each of the pixels of the second electrodes 435 configured in units of pixels. The first selector 441 may include 1-1-th to 1-n-th row selectors. The second selector 442 may include 2-1-th to 2-n-th column selectors. According to an embodiment, the first selector 441 and the second selector 442 may be configured integrally with the pressure sensing circuit 457.

According to an embodiment, the image processor 465 may be disposed inside the control circuit 465. The image processor 465 may receive pixel-specific voltages through the second electrodes 435 of the sensor module 420, and produce a fingerprint image of the external object (e.g., the finger). According to an embodiment, the image processor 465 may be configured as one firmware or logic along with the pressure sensing circuit 457.

Figure 10:
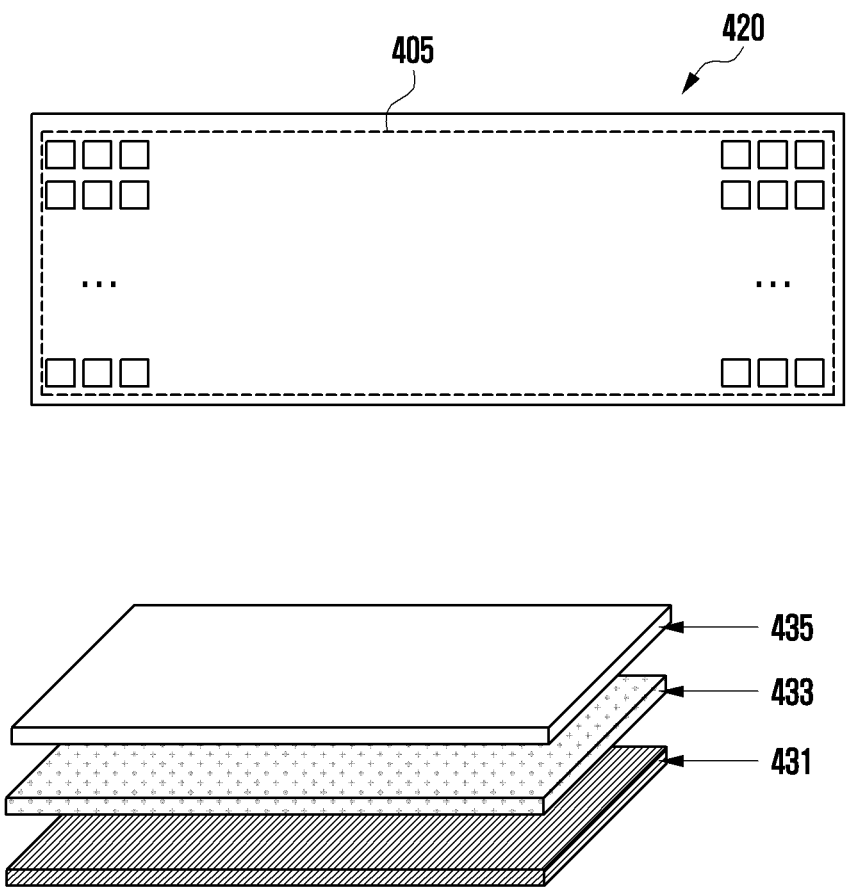
FIG. 10 is a view illustrating an example in which an entire region of a sensor module of an electronic device according to various embodiments of the disclosure is used as a pressure and fingerprint sensing region.

FIG. 10 is a view illustrating an example in which an entire region of a sensor module of an electronic device according to various embodiments of the disclosure is used as a pressure and fingerprint sensing region.

Referring to FIG. 10, the sensor module 420 of the electronic device according to various embodiments of the disclosure may utilize an entire region as a pressure and fingerprint sensing region 405 for the purpose of pressure sensing and fingerprint sensing.

According to an embodiment, in the case where the entire region of the sensor module 420 is utilized as the pressure and fingerprint sensing region 405, the first electrodes 431 may be configured integrally.

Figure 11:
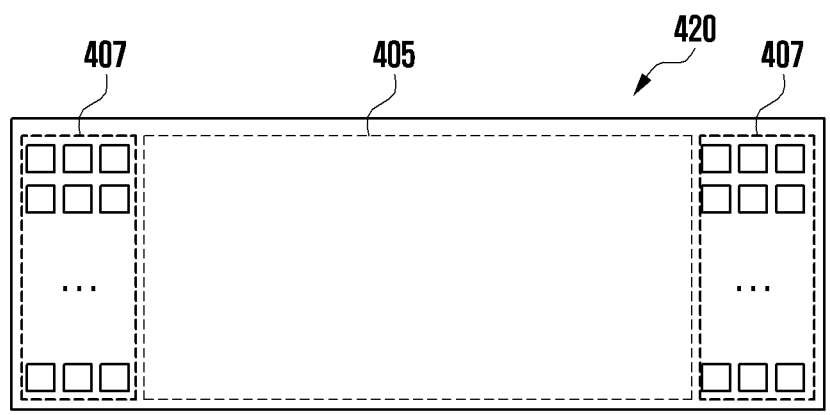
FIG. 11 is a view illustrating an example in which a partial region of a sensor module of an electronic device according to various embodiments of the disclosure is used as a pressure and fingerprint sensing region.
Figure 11:
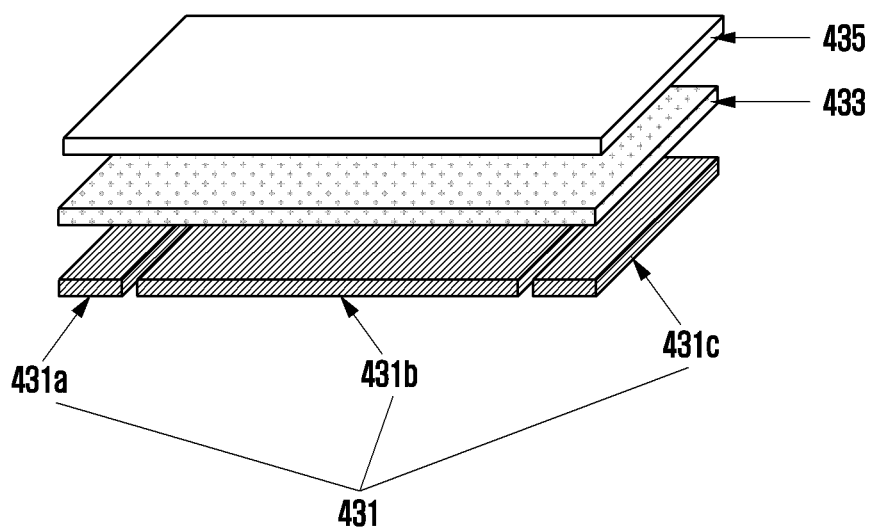

FIG. 11 is a view illustrating an example in which a partial region of a sensor module of an electronic device according to various embodiments of the disclosure is used as a pressure and fingerprint sensing region.

Referring to FIG. 11, the sensor module 420 of the electronic device according to various embodiments of the disclosure may utilize a partial region (e.g., a first region) as a pressure and fingerprint sensing region 405.

According to an embodiment, in the case where the partial region of the sensor module 420 is utilized as the pressure and fingerprint sensing region 405, the first electrodes 431 may be configured separately. For example, the first electrodes 431 may be configured to be separated into a first portion 431a, a second portion 431b, and a third portion 431c. According to an embodiment, the second portion 431b may be utilized as the pressure and fingerprint sensing region 405. The first portion 431a and the third portion 431c that are partial regions (e.g., second regions) different from the partial region (e.g., the first region) may be utilized as pressure sensing regions 407.

Figure 12:
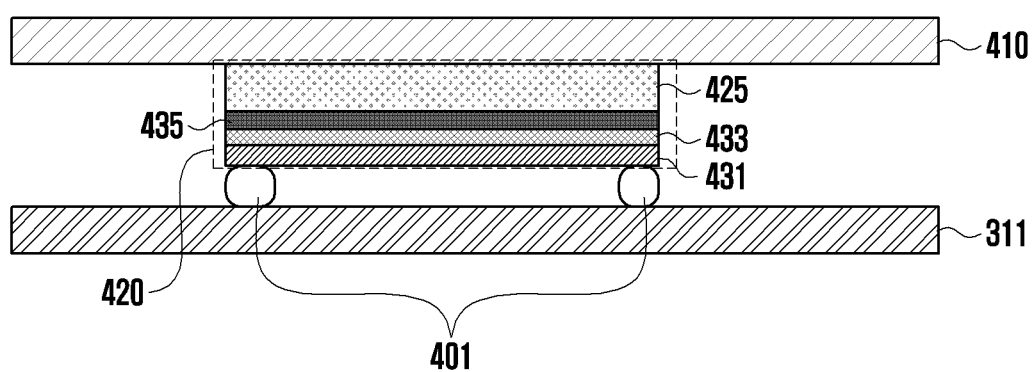
FIG. 12 is a view illustrating a configuration in which a support is added to a lower portion of a sensor module of an electronic device according to various embodiments of the disclosure.

FIG. 12 is a view illustrating a configuration in which a support is added to a lower portion of a sensor module of an electronic device according to various embodiments of the disclosure.

Referring to FIG. 12, at least a partial support 401 may be located at a lower portion of the sensor module 420 according to various embodiments of the disclosure.

According to an embodiment, the support 401 may be disposed between the first electrodes 431 of the sensor module 420 and a first support member (e.g., the first support member 311 or the bracket of FIG. 3). For example, depending on the degree that the piezoelectric layer 433 is pressed by the support 401 in order to detect the pressure applied to the display 410, an additional potential difference may be generated in a region of the piezoelectric layer 433 which corresponds to the support 401. According to an embodiment, as greater flexure is generated at the piezoelectric layer 433 by the support 401, a higher voltage is generated, and thus the sensor module 420 can more easily detect the pressure applied through the display 410.

FIGS. 13A to 13D are views illustrating an example in which a sensing region of a sensor module of an electronic device according to various embodiments of the disclosure is expanded.

Figure 13:
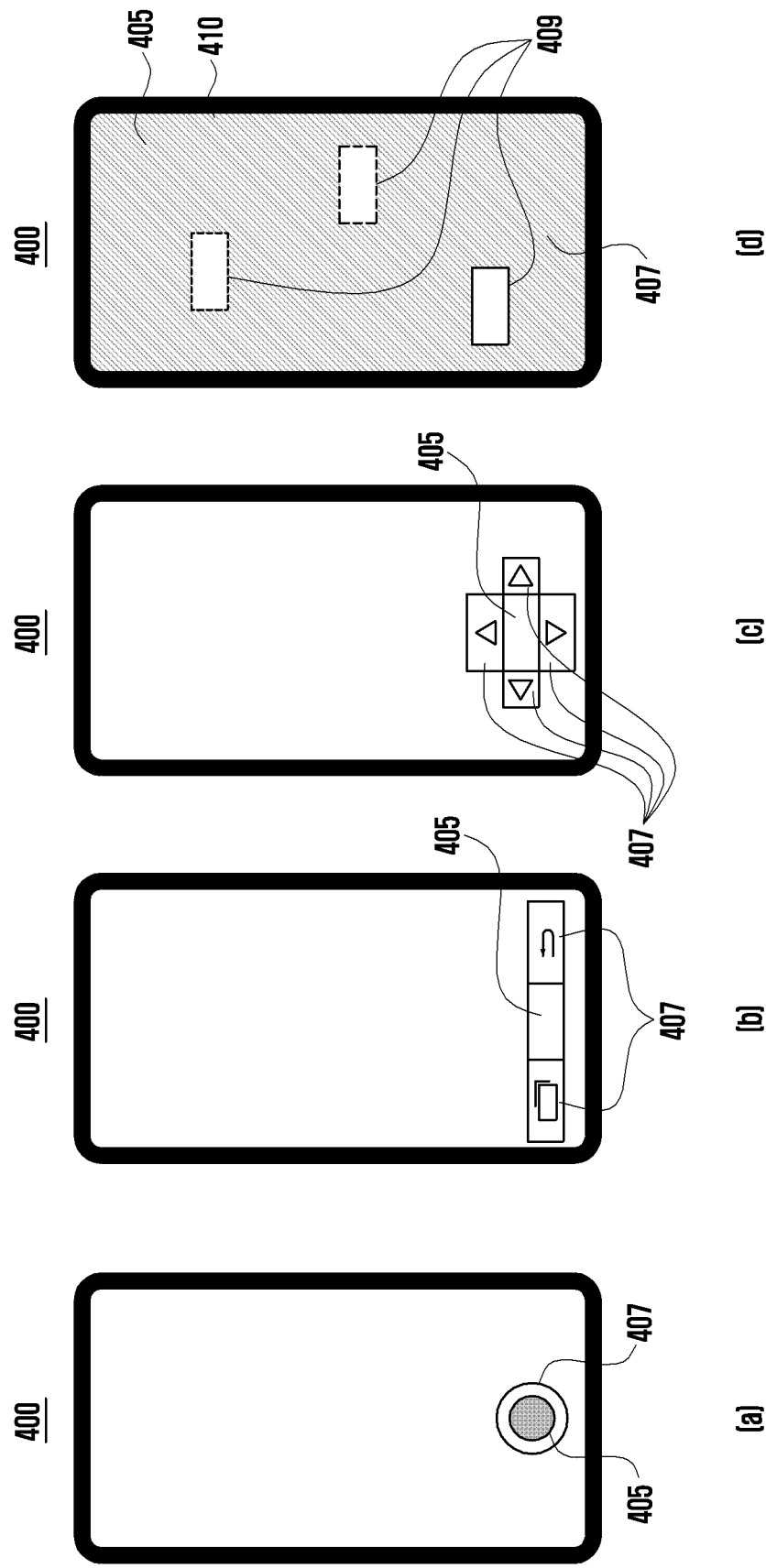
FIGS. 13A to 13D are views illustrating an example in which a sensing region of a sensor module of an electronic device according to various embodiments of the disclosure is expanded.

Referring to FIG. 13A, a pressure and fingerprint sensing region 405 of the sensor module 420 may be formed at the lower portion of the electronic device 400 in a circular shape, and be utilized as a region for pressure sensing and fingerprint sensing. A pressure sensing region 407 for sensing the pressure resulting from the fingerprint input of a user may be expanded and formed around an edge of the circular shape of the pressure and fingerprint sensing region 405.

Referring to FIG. 13B, a pressure and fingerprint sensing region 405 of the sensor module 420 may be formed at the lower portion of the electronic device 400 in a quadrilateral shape, and be utilized as a region for pressure sensing and fingerprint sensing. Pressure sensing regions 407 for sensing the pressure resulting from the fingerprint input of a user may be expanded and formed on left and right sides of the quadrilateral shape of the pressure and fingerprint sensing region 405.

Referring to FIG. 13C, a pressure and fingerprint sensing region 405 of the sensor module 420 may be formed at the lower portion of the electronic device 400 in a quadrilateral shape, and be utilized as a region for pressure sensing and fingerprint sensing. Pressure sensing regions 407 for sensing the pressure resulting from the fingerprint input of a user may be expanded and formed on upper, lower, left, and right sides of the quadrilateral shape of the pressure and fingerprint sensing region 405.

Referring to FIG. 13D, a pressure and fingerprint sensing region 405 of the sensor module 420 may be formed in an entire region of the front surface of the electronic device 400, and be utilized as a region for pressure sensing and fingerprint sensing. The pressure and fingerprint sensing region 405 may be utilized as a region for a pressure sensing region 407 and fingerprint sensing regions 409 over the entire region.

Figure 14:
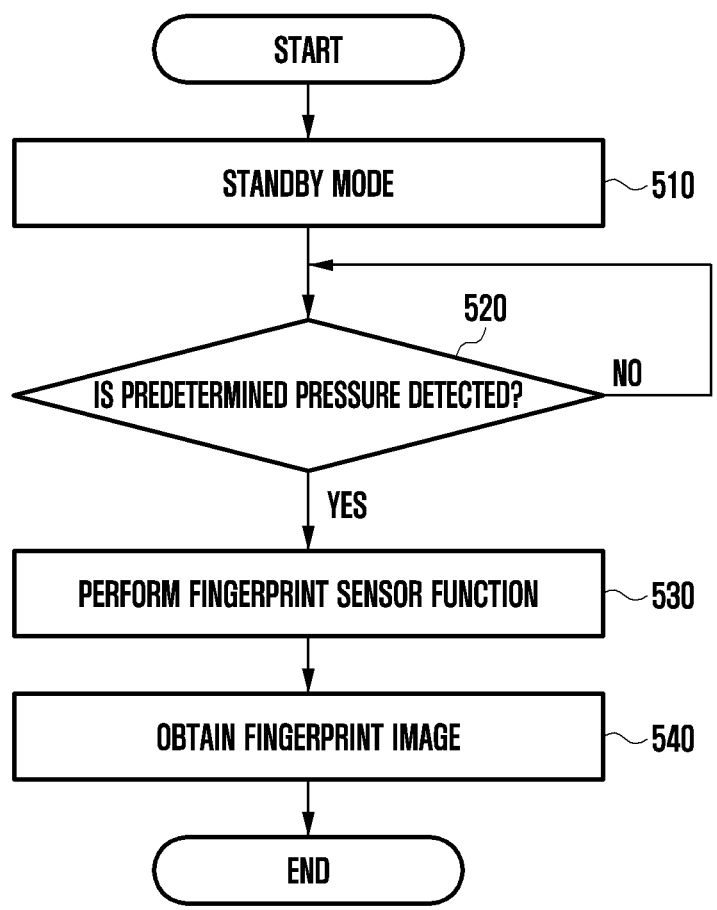
FIG. 14 is a flow chart illustrating an operation of an electronic device having a sensor module performing a plurality of functions according to various embodiments of the disclosure.

FIG. 14 is a flow chart illustrating an operation of an electronic device having a sensor module performing a plurality of functions according to various embodiments of the disclosure.

In process 510, the sensor module 420 and the control circuit 460 of the electronic device 400 may operate in a standby mode of waiting for fingerprint input of a user.

In process 520, the control circuit 460 may determine whether or not a predetermined pressure is detected by the sensor module 420 using an external object (e.g., a finger) through the display 410.

In process 530, if the predetermined pressure is detected, the control circuit 460 may control the sensor module 420 to perform a fingerprint sensor function in a pressure sensor function. According to an embodiment, the sensor module 420 may perform the pressure sensor function and the fingerprint sensor function at the same time. According to an embodiment, the control circuit 460 may control the sensor module 420 to operate in a Tx mode of transmitting an ultrasonic wave to the external object (e.g., the finger) that applies a pressure to the display 410 and in an Rx mode of receiving an ultrasonic wave from the external object.

In process 540, the control circuit 460 may receive the ultrasonic wave reflected from the external object in the Rx mode, and obtain a fingerprint image of a user of the electronic device 400.

Although the disclosure has been described above with reference to various embodiments of the disclosure, it would be obvious to those skilled in the art that alternations and modifications fall within the disclosure without departing from the technical spirit of the disclosure.

The invention claimed is:

1. An electronic device comprising:
a sensor module including a plurality of piezoelectric elements having a plurality of first electrodes and a plurality of second electrodes, a first signal terminal connected to the plurality of first electrodes, a second signal terminal, and a plurality of switches enabling the second signal terminal to be selectively connected to at least some of the plurality of second electrodes; and
a control circuit,
wherein the control circuit is configured to:
in a state in which the second signal terminal is connected to the at least some of the plurality of second electrodes by the plurality of switches, detect a pressure, which is input into the sensor module by at least some of the plurality of piezoelectric elements, through the first signal terminal;
on the basis of at least the pressure, in a state in which the second signal terminal is connected to the at least some of the plurality of second electrodes by the plurality of switches, output an ultrasound signal through the first signal terminal using at least some of the plurality of piezoelectric elements;
in a state in which the second signal terminal is disconnected from the at least some of the plurality of second electrodes using the plurality of switches, receive an ultrasound signal reflected from an external object using at least some of the plurality of piezoelectric elements; and
generate biological information about the external object on the basis of at least the received ultrasound signal, and
wherein some of the plurality of piezoelectric elements, which correspond to a first region of the sensor module, detect the pressure, and receive or transmit the ultrasound signal, and others of the plurality of piezoelectric elements, which correspond to a second region of the sensor module, detect the pressure.

2. The electronic device as claimed in claim 1, wherein, when the pressure is detected through the first signal terminal, the second signal terminal is connected to a ground of the electronic device.

3. The electronic device as claimed in claim 1, wherein, when the ultrasound signal is received, the first signal terminal is connected to a ground of the electronic device.

4. The electronic device as claimed in claim 1, wherein the control circuit is configured to connect the plurality of switches in order, and to obtain the received ultrasound signal.

5. The electronic device as claimed in claim 1, wherein the plurality of switches includes a thin-film transistor (TFT) array.

6. An electronic device comprising:
a sensor module including a plurality of piezoelectric elements having a plurality of first electrodes and a plurality of second electrodes, a first signal terminal connected to the plurality of first electrodes, a second signal terminal, and a plurality of switches enabling the second signal terminal to be selectively connected to at least some of the plurality of second electrodes;
a pressure sensing circuit configured to, in a state in which the second signal terminal is connected to the at least some of the plurality of second electrodes by the plurality of switches, detect a pressure, which is input into the sensor module by at least some of the plurality of piezoelectric elements, through the first signal terminal; and an ultrasound sensing circuit configured to, in a state in which the second signal terminal is disconnected from the at least some of the plurality of second electrodes using the plurality of switches, obtain an ultrasound signal reflected from an external object using at least some of the plurality of piezoelectric elements, and wherein some of the plurality of piezoelectric elements, which correspond to a first region of the sensor module, detect the pressure, and receive or transmit the ultrasound signal, and others of the plurality of piezoelectric elements, which correspond to a second region of the sensor module, detect the pressure.

7. The electronic device as claimed in claim 6, further comprising a switch circuit configured to selectively connect the first signal terminal to the pressure sensing circuit or the ultrasound sensing circuit.

8. The electronic device as claimed in claim 6, wherein:
when the pressure is detected through the first signal terminal, the second signal terminal is connected to a ground of the electronic device; and
when the ultrasound signal is obtained, the first signal terminal is connected to the ground of the electronic device.

9. The electronic device as claimed in claim 6, further comprising a control circuit,
wherein the control circuit is configured to generate biological information about the external object on the basis of at least the ultrasound signal obtained through the ultrasound sensing circuit.

10. The electronic device as claimed in claim 6, wherein the plurality of switches include first and second selectors that selectively detect a voltage applied to each pixel of the plurality of second electrodes.

11. An electronic device comprising:
a sensor module configured to include a plurality of piezoelectric elements having a plurality of first electrodes and a plurality of second electrodes, a first signal terminal connected to the plurality of first electrodes, a second signal terminal, and a plurality of switches enabling the second signal terminal to be selectively connected to at least some of the plurality of second electrodes; and
a control circuit,
wherein the control circuit is configured to:
in a state in which the second signal terminal is connected to the at least some of the plurality of second electrodes by the plurality of switches, detect a pressure, which is input into the sensor module by at least some of the plurality of piezoelectric elements, through the first signal terminal;
in a state in which the second signal terminal is disconnected from the at least some of the plurality of second electrodes using the plurality of switches, receive an ultrasound signal reflected from an external object using at least some of the plurality of piezoelectric elements; and
generate biological information about the external object on the basis of at least the received ultrasound signal, and
wherein some of the plurality of piezoelectric elements, which correspond to a first region of the sensor module, detect the pressure, and receive or transmit the ultrasound signal, and others of the plurality of piezoelectric elements, which correspond to a second region of the sensor module, detect the pressure.

12. The electronic device as claimed in claim 11, wherein:
when the pressure is detected through the first signal terminal, the second signal terminal is connected to a ground of the electronic device; and
when the ultrasound signal is obtained, the first signal terminal is connected to the ground of the electronic device.

* * * * *